United States Patent
Chatterjea

(10) Patent No.: US 6,523,636 B2
(45) Date of Patent: Feb. 25, 2003

(54) CRAWLER MOTION CONTROL SYSTEM

(75) Inventor: Probir Chatterjea, Sleepy Hollow, IL (US)

(73) Assignee: Probir Chatterjea & Associates, Inc., Sleepy Hollow, IL (US)

( * ) Notice: Subject to any disclaimer, the term of this patent is extended or adjusted under 35 U.S.C. 154(b) by 0 days.

(21) Appl. No.: 09/790,929

(22) Filed: Feb. 22, 2001

(65) Prior Publication Data

US 2001/0035303 A1 Nov. 1, 2001

Related U.S. Application Data

(60) Provisional application No. 60/184,056, filed on Feb. 22, 2000.

(51) Int. Cl.[7] .............................................. B60K 26/00
(52) U.S. Cl. ........................ 180/333; 180/315; 180/6.2; 180/6.7; 192/225
(58) Field of Search ........................ 180/333, 6.2, 6.3, 180/6.32, 6.7, 6.62, 6.24, 9.44, 367, 315, 321, 322, 323, 336, 6.4, 6.48, 242, 247, 9.3; 192/225

(56) References Cited

U.S. PATENT DOCUMENTS

| | | | | |
|---|---|---|---|---|
| 3,633,436 A | * | 1/1972 | Freiburger | 74/471 XY |
| 3,785,450 A | * | 1/1974 | Suzuki | 180/6.7 |
| 4,494,621 A | * | 1/1985 | Nagata | 137/596 |
| 4,541,497 A | * | 9/1985 | Riediger et al. | 180/6.48 |
| 4,699,239 A | * | 10/1987 | Ishino et al. | 180/315 |
| 5,285,861 A | * | 2/1994 | Nakamura | 180/333 |
| 5,375,686 A | * | 12/1994 | Yamamoto | 180/6.2 |
| 5,868,230 A | * | 2/1999 | Chatterjea et al. | 192/13 R |
| 5,937,897 A | * | 8/1999 | Chatterjea et al. | 137/554 |
| 6,283,263 B1 | * | 9/2001 | Ibuki | 180/6.7 |
| 6,328,127 B1 | * | 12/2001 | Hori | 180/333 |

\* cited by examiner

*Primary Examiner*—Kevin Hurley
*Assistant Examiner*—Daniel Yeagley
(74) *Attorney, Agent, or Firm*—King & Jovanovic, PLC

(57) ABSTRACT

A motion control system for controlling the motion of a crawler having a left and right track. The system comprises a pivotally mounted controller; a steering control system hydraulically communicable with a pressurized fluid supply, a brake of each of a left and right track of a crawler and a clutch of each of a left and right track of a crawler, a direction control system hydraulically communicable with a pressurized fluid supply, a forward and a reverse transmission signal input, a steering speed controlling system for controlling the speed of a left track and a right track, and a transmission gear controlling system. The steering speed controlling system includes at least one selector. The transmission gear controlling system includes at least one transmission gear selector. The steering control system is positioned so that pivoting the controller in a first series of planes operates the steering control system. Similarly, pivoting the controller in a second series of planes operates the direction control system. Furthermore, the at least one selector and the at least one transmission gear selector are associated with the controller.

16 Claims, 7 Drawing Sheets dr# CRAWLER MOTION CONTROL SYSTEM

This application claims the benefit of provisional application No. 60/184,056 filed Feb. 22, 2000.

BACKGROUND OF THE INVENTION

1. Field of the Invention

The invention is directed to vehicle control systems, and more particularly, to a crawler motion control system which can control the direction, speed and steering of a crawler from a single joystick control. It will be understood that the system is not limited solely to crawlers, and may have application to other types of vehicles, including bulldozers and excavators, and other vehicles having tracks.

2. Background Art

Systems for controlling the movement of crawlers or other tracked construction or heavy equipment has long been known in the art. Generally, such systems are designed so that the driver of such a vehicle is required to use two hands to execute maneuvers. In other situations, a single hand can be used to operate the system, however, it becomes necessary for the user to grab several different control device, such as several joysticks. Such controls require great expertise, and repeated use tends to tire a user.

Still other solutions have placed all such controls on a single joystick. While these solutions have been advances that have attempted to address the shortcomings of the multiple control devices, these solutions have nevertheless suffered from several drawbacks. Specifically, many of these systems are exceedingly complicated. As a result, the production cost is excessive. Furthermore, since these systems require a multitude of custom components and tight tolerances, the reliability of such systems suffers.

Accordingly, it is an object of the invention to develop a single control system for controlling the motion of a crawler.

It is an additional object of the invention to simplify the components necessary for a control system so as to increase the reliability of same.

It is a further object of the invention to minimize the cost associated with the production of a single control system for a crawler.

These and other objects will become apparent in light of the specification and claims appended hereto.

SUMMARY OF THE INVENTION

The invention comprises, in part, a motion control system for controlling the motion of a crawler having a left and right track. In one aspect, the system comprises a pivotally mounted controller, steering control means and direction control means. The steering control means is hydraulically communicable with a pressurized fluid supply, a brake of each of a left and right track of a crawler and a clutch of each of a left and right track of a crawler. The direction control means hydraulically communicable with a pressurized fluid supply, a forward and a reverse transmission signal input. The steering control means is positioned so that pivoting the controller in a first series of planes operates the steering control means and pivoting the controller in a second series of planes operates the direction control means.

In a preferred embodiment, the steering control means further comprises a first and a second steering valve. The first steering valve is hydraulically communicable with a pressurized fluid supply, a clutch and brake of the right track of a crawler. The second steering valve is hydraulically communicable with a pressurized fluid supply, a clutch and brake of the left track of a crawler. Pivoting the controller in a first series of planes moves one of the first and second steering valves relative to a respective casing, to, in turn, alter the hydraulic communication between a respective pressurized fluid supply and a respective clutch and brake.

In a preferred embodiment, the first steering valve is hydraulically communicable with a right clutch of the crawler, to, in turn, facilitate the selective disengagement of a high clutch setting for the right clutch. In another preferred embodiment, the second steering valve is hydraulically communicable with a left clutch of the crawler, to, in turn, facilitate the selective disengagement of a high clutch setting for the left clutch.

In another preferred embodiment, the first steering valve and the second steering valve are substantially identical.

Preferably, the direction control means further comprises a forward valve hydraulically communicable with a pressurized fluid supply and a forward transmission signal input and a reverse valve hydraulically communicable with a pressurized fluid supply and a reverse transmission signal input. Pivoting the controller in a second series of planes moves one of the forward and reverse valve relative to a respective casing, to, in turn, hydraulically communicate a pressurized fluid supply with one of a forward or reverse transmission signal input.

In a preferred embodiment, the forward valve includes a hydraulic lock member, to, in turn, utilize fluid from a pressurized fluid supply to maintain the forward valve in an engaged position. In another embodiment, the reverse valve includes a hydraulic lock member, to, in turn, utilize fluid from a pressurized fluid supply to maintain the rearward valve in an engaged position.

In another preferred embodiment, the motion control system further comprises means for controlling the steering speed of a left track and a right track. In one such embodiment, the motion control system includes at least one selector associated with the controller. In another such embodiment, the at least one selector comprises a left gear switch associated with a left clutch, the left gear switch having at least two settings and a right gear switch associated with a right clutch, the left gear switch having at least two settings.

In yet another preferred embodiment, the motion control system further comprises means for controlling the transmission gears. Preferably, the transmission gear control means includes at least one transmission selector member associated with the controller.

In another aspect of the invention, the invention comprises a motion control system for controlling the motion of a crawler having a left and right track. The system comprises a pivotally mounted controller, steering control means hydraulically communicable with a pressurized fluid supply, a brake of each of a left and right track of a crawler and a clutch of each of a left and right track of a crawler, direction control means hydraulically communicable with a pressurized fluid supply, a forward and a reverse transmission signal input, means for controlling the steering speed of a left track and a right track, the steering speed controlling means having at least one selector, and means for controlling the transmission gears, the transmission gear controlling means having at least one transmission gear selector. In such an aspect of the invention, the steering control means is positioned so that pivoting the controller in a first series of planes operates the steering control means. Similarly, pivoting the controller in a second series of planes operates the direction control means. Moreover, the at least one selector and the at least one transmission gear selector is associated with the controller.

The invention likewise comprises a method of controlling the motion of a crawler having a left and right track. The method comprises the steps of providing a pivotally mounted controller; selectively pivoting the controller along a first series of planes, wherein a pivot to the left directs the crawler to the left, and a pivot to the right directs the crawler to the right and selectively pivoting the controller along a second series of planes, wherein a pivot forward directs the crawler into a forward gear, and a pivot to the rear directs the crawler to the left.

In a preferred embodiment, the method further comprises the steps of providing at least one selector for each track on the controller and selectively manipulating at least one selector for at least one track to selectively engage one of at least two clutch settings. In one such embodiment, the method further comprises the steps of providing at least one transmission selector on the controller, and selectively manipulating the at least one transmission selector to selectively engage one of at least two transmission gears.

DETAILED DESCRIPTION OF THE DRAWINGS

Figure 1:
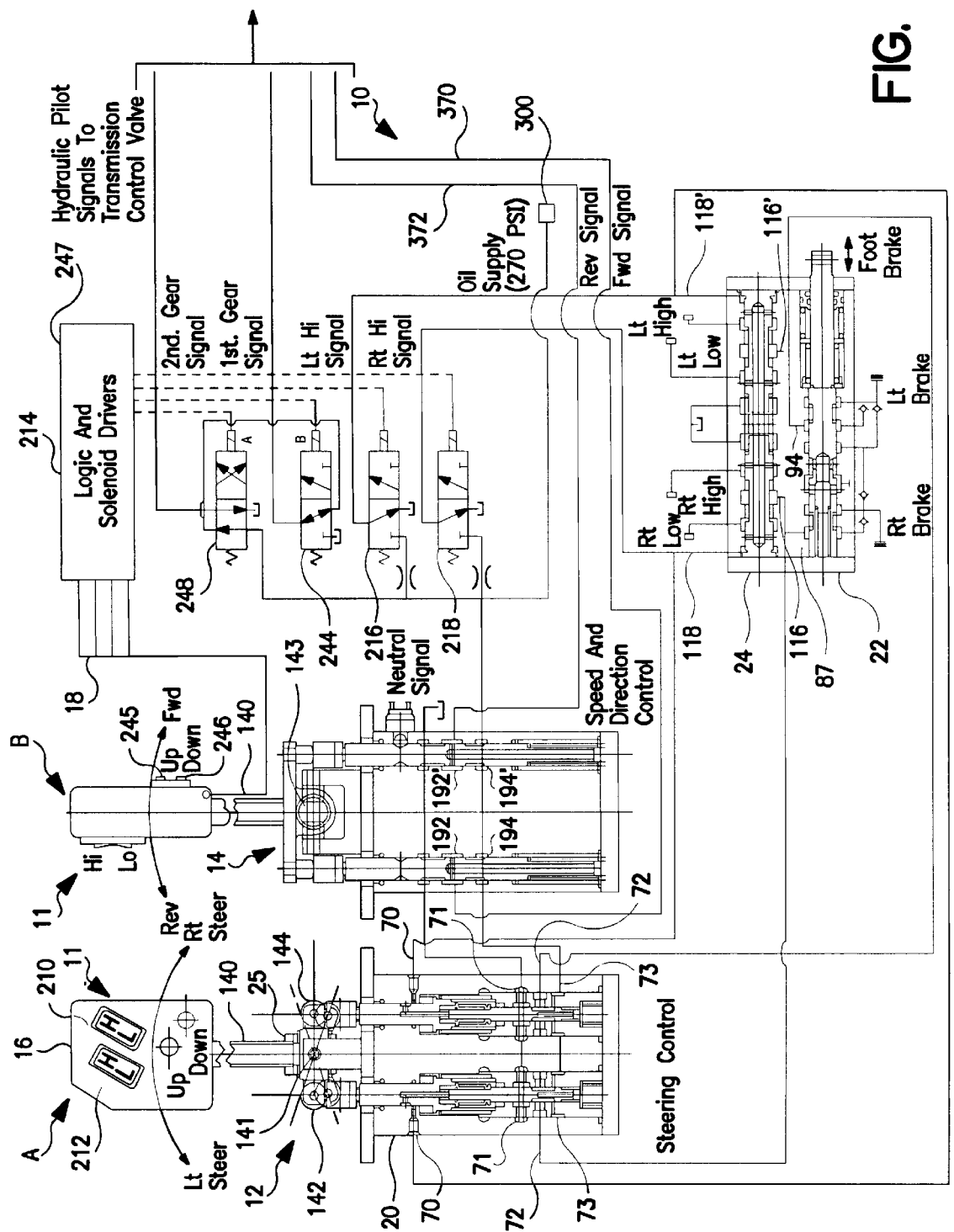
FIG. 1 of the drawings is a schematic representation of the system of the present invention.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

Crawler motion control system 10 is shown in FIG. 1 as comprising steering control means 12, direction control means 14, steering speed control means 16 and transmission gear control means 18. As can be seen in FIG. 1, and as will be explained in detail below, each of the means can be controlled by the driver of the crawler from a single pivotably mounted controller 11 which in this embodiment comprises a joystick controller (shown in one plane as A and in an orthogonal plane as B). While the description will refer to a crawler, it will be understood that crawler includes track driven machinery such as a bulldozer, a dozer/loader, excavators, as well as other construction equipment and machinery which operate by way of a rolling track.

Figure 2:
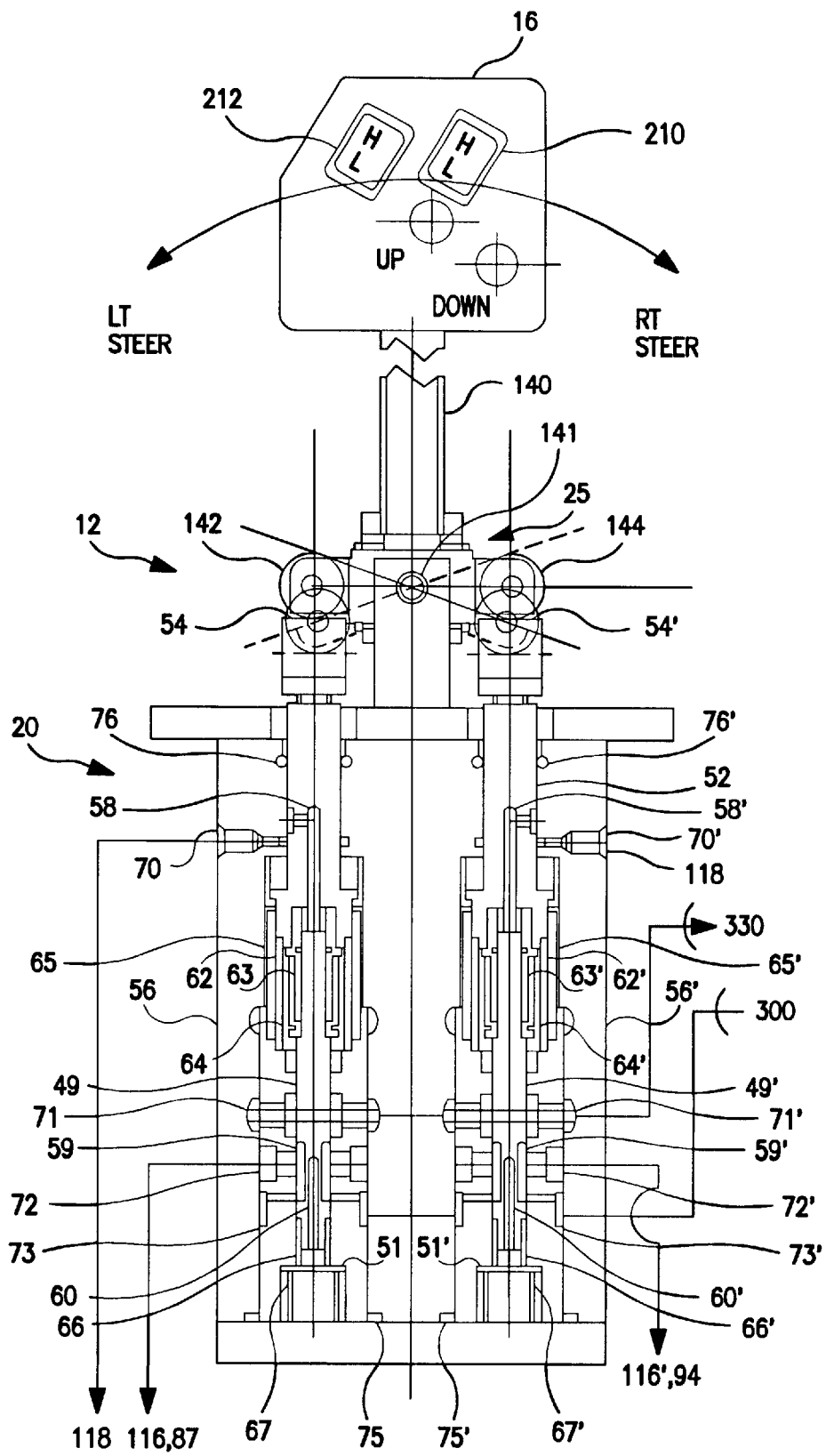
FIG. 2 of the drawings is a schematic representation of the joystick of the present invention shown in FIG. 1.

Specifically, steering control means 12, comprises first valve pair 20 and means 25 for selectively actuating one of the first valve pair as shown in FIG. 1 as well as, brake controller 22 and steering high and low range clutch controller 24. With reference to FIG. 2, first valve pair 20 includes first (in this embodiment left) steering valve 50 and second (in this embodiment right) steering valve 52. Left steering valve 50 will be explained in detail with the understanding that right steering valve 52 is substantially identical thereto. Left steering valve 50 includes valve input spool 54, metering spool 49 and casing 56. Metering spool 49 includes fluid port 58, coupling fluid port 59, equalization pressure fluid port 60, metering springs 62, 63, return spring 64, centering spring 65, anti-drift spring 66 and neutral feel spring 67 associated with platform 51.

Likewise as shown in FIG. 2, casing 56 comprises high range signal dump port 70, low pressure port 71, brake/clutch feed port 72 and supply port 73, lower seal 75 and upper input spool seal 76.

Right steering valve 52 includes similar passages and, accordingly, the same reference numerals used to identify left steering valve 50, augmented with a prime (') have been utilized.

Figure 3:
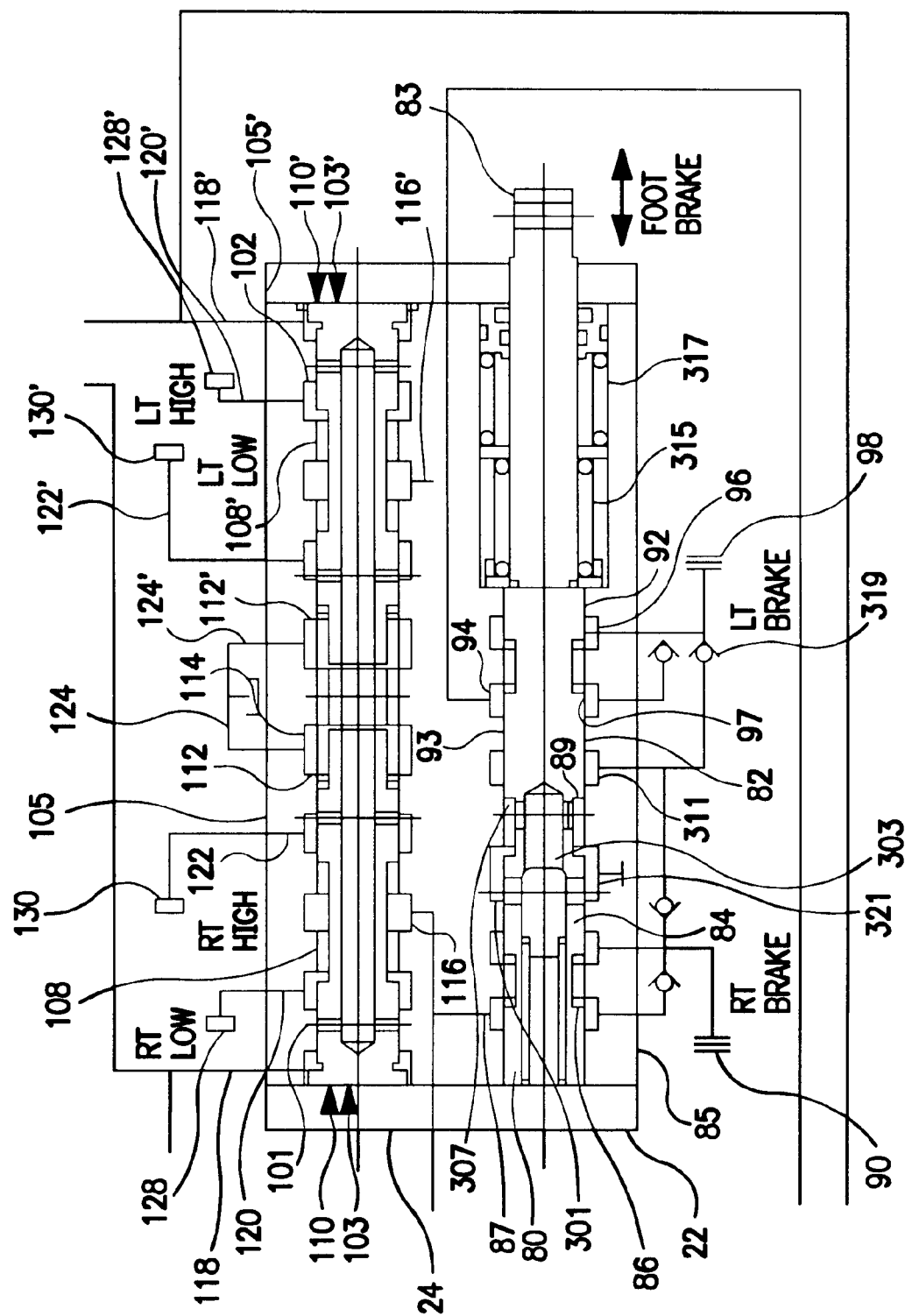
FIG. 3 of the drawings is a schematic representation of the brake and clutch system of the present invention.

Brake controller 22 is shown in FIG. 3 as comprising right brake valve 80, left brake valve 82 and foot pedal linkage point 83. Right brake valve 80 includes brake spool 84 and casing 85. Brake spool 84 includes communication port 86, spring 301, poppet valve 303 and output passages 305, 307. Casing 85 includes right clutch communication port 87 and brake communication port 89, drain ports 309 and 311. Drain port 311 is in contact with each of the left and right brakes.

Left brake valve 82 includes brake spool 92 and casing 93. In the embodiment shown, brake spool 84 and brake spool 92 are integrally associated with each other. Brake spool 92 includes communication port 97 and springs 315, 317. Casing 93 includes left clutch communication port 94 and brake communication port 96.

In normal operation of the brakes, as the user depresses the brake, which pulls foot pedal 83 away from casing 85. Initially, the user feels resistance from return spring 315 as the pedal is depressed. After some travel of the pedal, the two brake spools move such that clutch communication ports 87 and 94 are isolated from brakes. Next, as the user further moves the foot brake, port 307 becomes in fluid communication with port 311. At such time, fluid is directed from right brake 90, through check valve 321 into port 311, and enter into port 307. At the same time, fluid is directed from left brake 98, through check valve 319 into port 311, and in turn, into port 307.

As long as the pressure within port 307 is greater than the spring force in spring 301 valve poppet 303 will be moved relative to the spool, to place port 307 an port 305 (line to tank) in fluid communication. Once the fluid pressure provides a force that is less than the force of the spring, the valve will close and further fluid will not pass to port 305.

As such, as the user depresses the brake slowly, the user will be able to feather the brake. The two return springs 317 and 315 are configured that the engagement of the second spring 317 occurs at a neutral position (i.e. as the brakes begin to fully engage) to provide feedback to the user.

Figure 7:
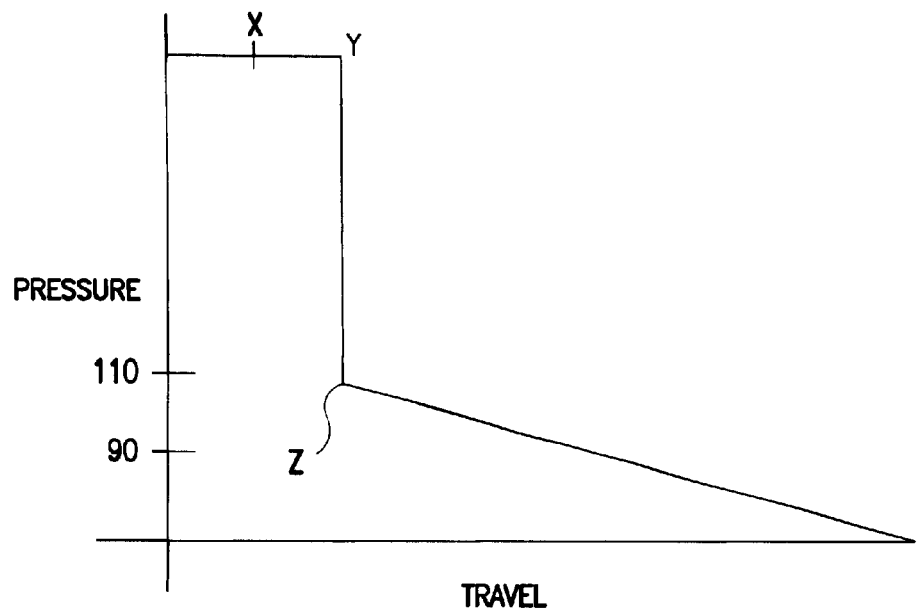
FIG. 7 of the drawings is a plot of brake travel versus clutch pressure.

FIG. 7 shows a plot of brake pressure versus pedal travel. Specifically, the clutch and brake are separated at point x, the ports 307 and 311 engage each other at point y wherein the fluid and the spring reach equilibrium at point z, further movement engages the brake further. Generally, the brakes begin to grab between 110 psi and 90 psi for one embodiment of the inventions.

Clutch controller 24 is shown in FIG. 3 as comprising right clutch control valve 101 and left clutch control valve 102. Right clutch control valve 101 includes clutch spool 103 and casing 105. Clutch spool 103 includes communication port 108, stopper region 110, outlet port 112, and biasing means 114. Biasing means 114 may comprise a spring which is configured to force the clutch spool in the desired orientation, unless the biasing means is overcome by the force of the fluid proximate the stopper region 110.

Casing 105 includes clutch gear input 116, high gear signal input 118, low gear output 120, high gear output 122 and drain output 124. Low gear output 120 is in fluid communication with low speed clutch 128. Similarly, high gear output 122 is in fluid communication with high speed clutch 130. Drain output 124 is associated with the hydraulic tank.

Left clutch control valve 102 is substantially identical to right clutch control valve 101. As such, the same reference numerals used for right clutch control valve 101 are utilized for left clutch control valve 102, augmented with a prime (').

As can be seen in FIG. 1, certain of the ports of casing 56, 56' are in fluid communication with certain ports of casing 85, 93, 105 and 105'. Specifically, signal dump port 70 is in fluid communication with high gear signal input 118'. Similarly signal dump port 70' is in fluid communication with high gear signal input 118. Brake/clutch feed port 72 is in fluid communication with each of low gear input 116 and inlet port 87. Brake/clutch feed port 72' is in fluid communication with each of gear input 116' and inlet port 94. Each of ports 73 and 73' are in fluid communication with hydraulic supply 300, which is generally at an elevated pressure, such as, for example 270 psi. Ports 71, 71' are each in fluid communication with the hydraulic return/storage tank 330.

Referring now to FIG. 2, selective actuation means comprises the movement of controller (joystick) 11 which includes stalk 140 and lobes 142, 144 in a series of parallel planes (i.e. regardless of the position of the controller in a forward-backward plane, the controller can pivot left to right). Each of lobes 142 and 144 include roller bearings, however, other interfaces with valve spools 54, 54'. As will be understood, as stalk 140 is pivoted about axis of rotation 141 (in this embodiment left to right), each of spools 54, 54' can be selectively actuated. As will be understood, pivoting the stalk to the left will direct the crawler to the left. Pivoting the stalk to the right will direct the crawler to the right.

In operation of the steering control means, in a neutral position, the crawler defaults to a straight forward setting. Specifically, the joystick defaults to a neutral centered position. This is accomplished by return springs 64, 64' and centering springs 54, 54'. In particular, the centering springs comprise relatively strong springs which equalize the joystick in a centered position. Additionally, in the neutral position, spool 54 is positioned relative to casing 56 such that coupling fluid port 59 places supply port 73 in fluid communication with brake/clutch feed port 72. Similarly, relative to spool 54', coupling fluid port 59' places supply port 73' in fluid communication with brake/clutch feed port 72'. In such a position, the fluid from supply ports 73, 73' (typically at about 270 psi) is transmitted to each of the gear inputs 116, 116' and brake inlet ports 86 and 94.

In such a position, full pressure to the gear inputs 116, 116' maintains full pressure on the desired selected clutch to maintain full engagement of the desired clutch. In addition, full pressure to the brake inlet ports 86, 94 overcomes the brake spring force and maintains the brakes in a fully disengaged position.

As the driver is in need of turning the vehicle in either of the right or left direction, the user begins to initiate the pivoting of the joystick 11 toward the left or toward the right. In the situation where the driver desires to turn to the left, the driver initiates movement of the joystick to the left. As the joystick is pivoted to the left, lobe 142 pushes down on spool 54 and lobe 144 moves away from spool 54'. Accordingly, the spools begin to move, and in particular, spool 54 moves in a downward direction relative to the casing, whereas spool 54' moves in an upward direction relative to the casing.

As the spools continue to move, eventually signal dump port 70 comes into communication with fluid port 58. In such a situation, if the right high clutch was selected, and, correspondingly, fluid pressure was present in high gear signal input 118, such fluid is directed to fluid port 58 which is in communication with low pressure port 71 and with the storage tank. Thus, regardless of which clutch is selected (Hi or Low), once the signal dump port 70 is in fluid communication with fluid port 58, the clutch returns to the low setting.

Thus, to initiate the turn, the track opposite to the direction of the turn returns to the low clutch setting. For a slow turn, it may not be necessary to further turn the joystick. For example, if the left track clutch is in the low position, and the right track clutch is in the high position, the crawler will naturally be guided to the left.

However, if a tighter turn, or a quicker turn is desired, the driver further rotates joystick 11 to the left. As the travel of the joystick continues, input spool 54 and metering spool 49 continue their downward travel, while maintaining the fluid communication between supply port 73 and brake/clutch feed port 72. To the contrary, input spool 54' moves in the opposite direction, relaxing metering springs 62', 63'.

As the metering springs relax, the force imported by the springs onto metering spool 49' is reduced. As a result, the high pressure fluid within the passage 60' of metering spool 49' forces the spool upward until a force equilibrium between the two is reached. Since the metering springs have been relaxed, the pressure within the metering spool 49' decreases. In turn, the fluid pressure within passage 72' is reduced, changing the pressure applied to each of the left clutch and brake.

Figure 8:
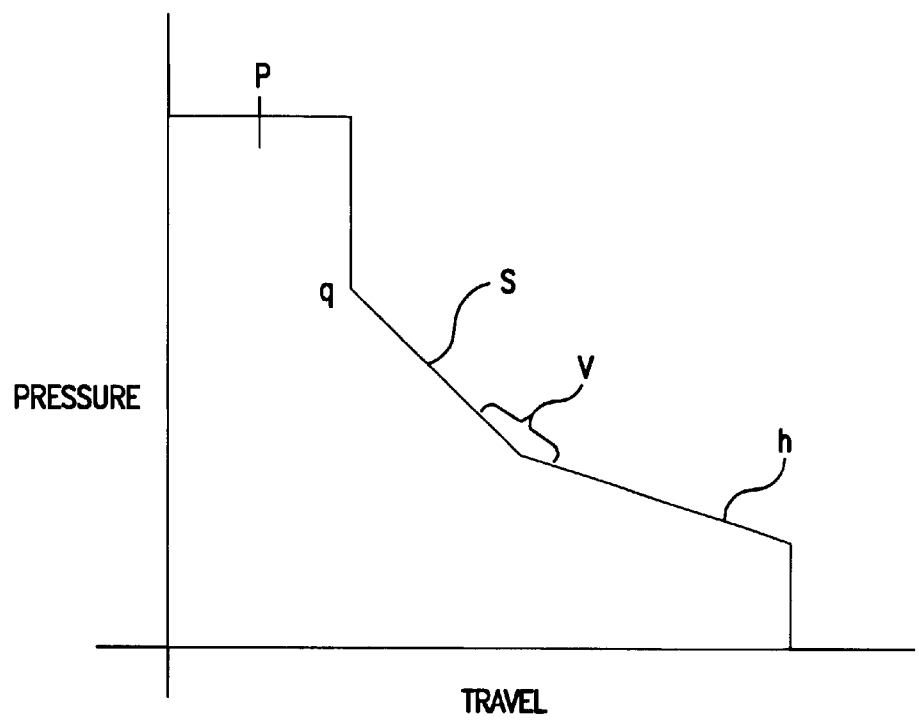
FIG. 8 of the drawings is a plot of joystick travel versus system pressure to the relevant clutch and brake.

FIG. 8 shows a plot of the joystick movement/travel relative to the pressure in port 72. As can be seen, at a travel of p, the port 58' and 70' come into fluid contact and the high speed port is dumped to the tank (this is explained in detail below). At a travel of q, the metering springs relax and equilibrium is reached between the metering springs and the fluid in passage 60'. Further movement along the line s begins to feather the clutch. Somewhere in the range v, the clutch is fully disengaged and the brake is not yet engaged. Further in range v, the brake begins to engage. This does not happen until after the clutch is disengaged so that the clutch and the brake do not compete against each other. As the travel extends into zone n, the brake is being feathered. Approaching the end of the travel, the brake becomes fully engaged. In turn, the fluid pressure transmitted to clutch input 116' and left brake input 94 is reduced. Correspondingly, the clutch will not be engaged as strongly. The further that the joystick is pivoted, the less the clutch is engaged and the closer the brake engagement becomes. This is sometimes referred to as feathering the brake and feathering the clutch.

During the movement of the joystick, at a predetermined point, spool 54 reaches platform 51. When platform 51 is reached, further movement of spool 54 begins to compress spring 67, which the user, in turn, feels as resistance. The purpose of platform 51 is to indicate and provide feedback to the user that the neutral point has been reached, where the clutch is no longer engaged, and the brake has not yet begun to engage, namely, range v of FIG. 7. At the end of the joystick travel, it will be understood that fluid pressure through brake/clutch feed port 72' has virtually dropped to zero thereby fully releasing the clutch and fully engaging the brake. In this position, maximum turning is achieved.

It will be understood that a turn in the opposite direction would be performed in substantially the same manner, except that the joystick would be turned to the right. Spool 54' would undergo the same movement as spool 54 in a left turn, and spool 54 would undergo the same movement as spool 54' in a right turn.

Steering speed control means 16 as shown in FIG. 1 comprises left gear switch 212, right gear switch 210 (collectively selector members), solenoid driver circuit 214, left gear solenoid 216 and right gear solenoid 218. Left gear switch includes a first position which is labeled H and a second position which is labeled L. The right gear switch has a similar configuration. As will be understood, when either switch is in the H position, the respective solenoid is directed by solenoid driver to activate. When either switch is in the L position, the respective solenoid is directed by solenoid driver to deactivate.

Figure 4:
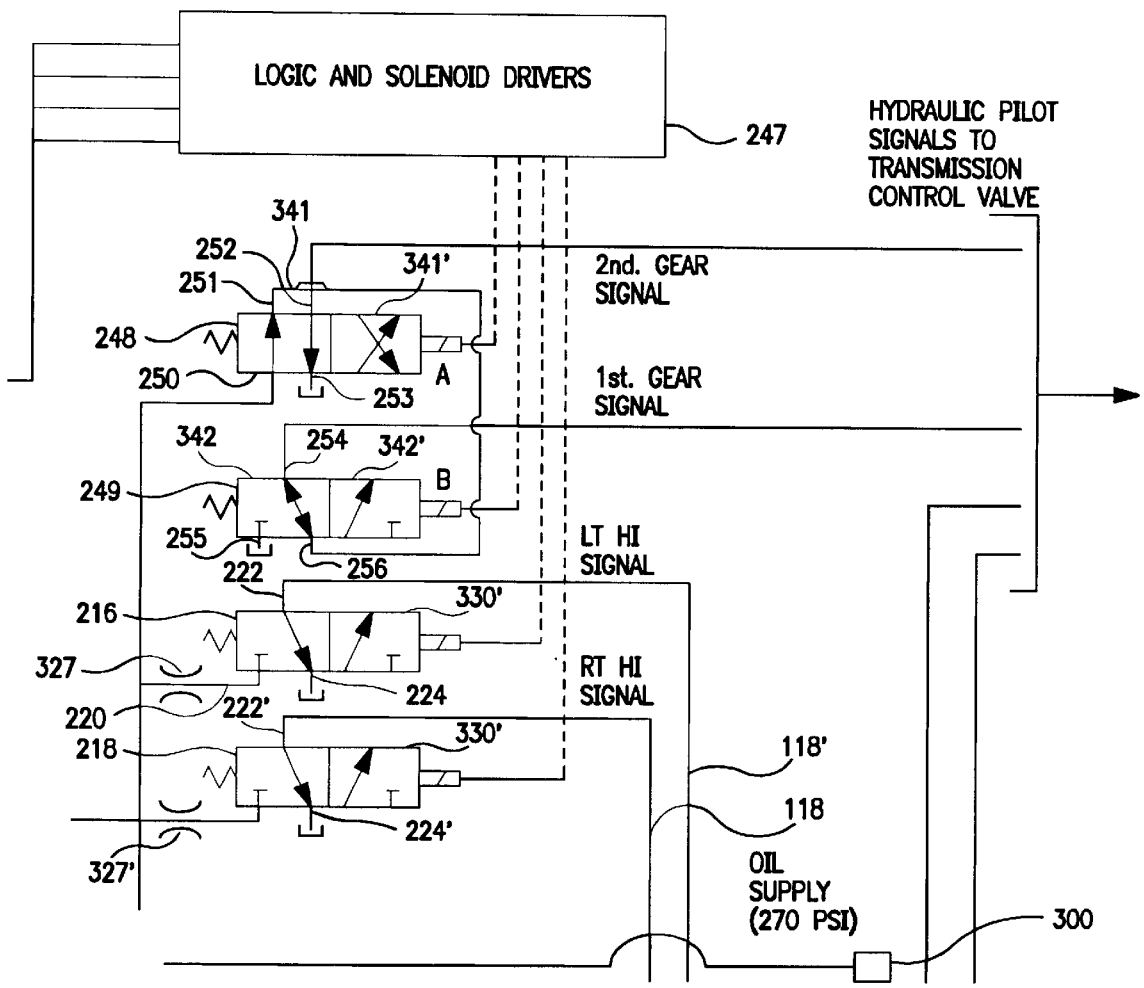
FIG. 4 of the drawings is a schematic representation of the electrical control system of the present invention.

Referring now to FIG. 4, left gear solenoid 216 includes three ports, namely feed port 220, connection port 222 and tank port 224. Feed port 220 is in communication with hydraulic fluid feed line. Connection port 222 is associated with left high gear signal input 118'. In the deactivated state, feed port 220 is closed and port 222 is in fluid communication with tank port 224, which, in turn, drains fluid from left high gear signal input 118' into the low pressure holding tank. With reference to FIG. 3, as the input 118' is directed to the tank, spring 114' forces spool 103' so as to render left gear input 116' in fluid communication with communication port 108' and low gear output port 120', which in turn provides fluid to engage low clutch 128'.

In the activated state, shown schematically is FIG. 4 as 330, feed port 220 is in fluid communication with port 222, and tank port 224 is closed. Accordingly, fluid under pressure from feed port 220 is directed into left high gear signal input 118' which overcomes the force of spring 114' to move spool 103' so that left gear input 116' is in fluid communication with communication port 108' and high gear output port 122', which in turn provides fluid to engage high clutch 130'.

It will be understood that solenoid 218 operates in the same manner as solenoid 216 and achieves the same results with respect to the operation of the right low and high clutches. Accordingly, similar reference numerals augmented by a prime (') have been utilized for solenoid 218.

As shown in FIG. 4, each of input parts 220, 220' include orifices 327 and 327', respectively. The orifices assist to limit the fluid flow through the solenoids. In one embodiment, the flow is generally limited to about one gallon per minute (GPM). The purpose of limiting this flow is that in the situation wherein the high steering gear is selected, but due to joystick travel, the high gear selection fluid is being dumped to tank, without the orifice limiting the flow, the quantity of flow through the solenoids may be elevated such that the rest of the system may experience undesirable flow pressure losses or decreases. For example, the high range signal port may not drop to low tank pressures thereby not properly disengaging the high steering speed clutch.

Likewise it will be understood that in the event of a loss of electrical power, the solenoids will become de-energized, and as such the system will return to the low clutch setting. This is a safety feature because, if selection is not available, it is more desirable to return to a low clutch setting than to be positioned in a high clutch setting.

Referring now to FIG. 2, it will be understood as explained above relative to the steering, as ports 58 and 70 become in fluid communication, regardless of the setting of switch 216, fluid directed to high gear signal input 118' will be directed to port 58 and in turn, to the low pressure fluid tank. Thus, the respective left side will return to the low clutch setting. In a similar manner as ports 58' and 70' become in fluid communication, regardless of the setting of switch 218, high gear signal input 118 will be directed to port 58' and in turn, to the low pressure fluid tank.

Figure 5:
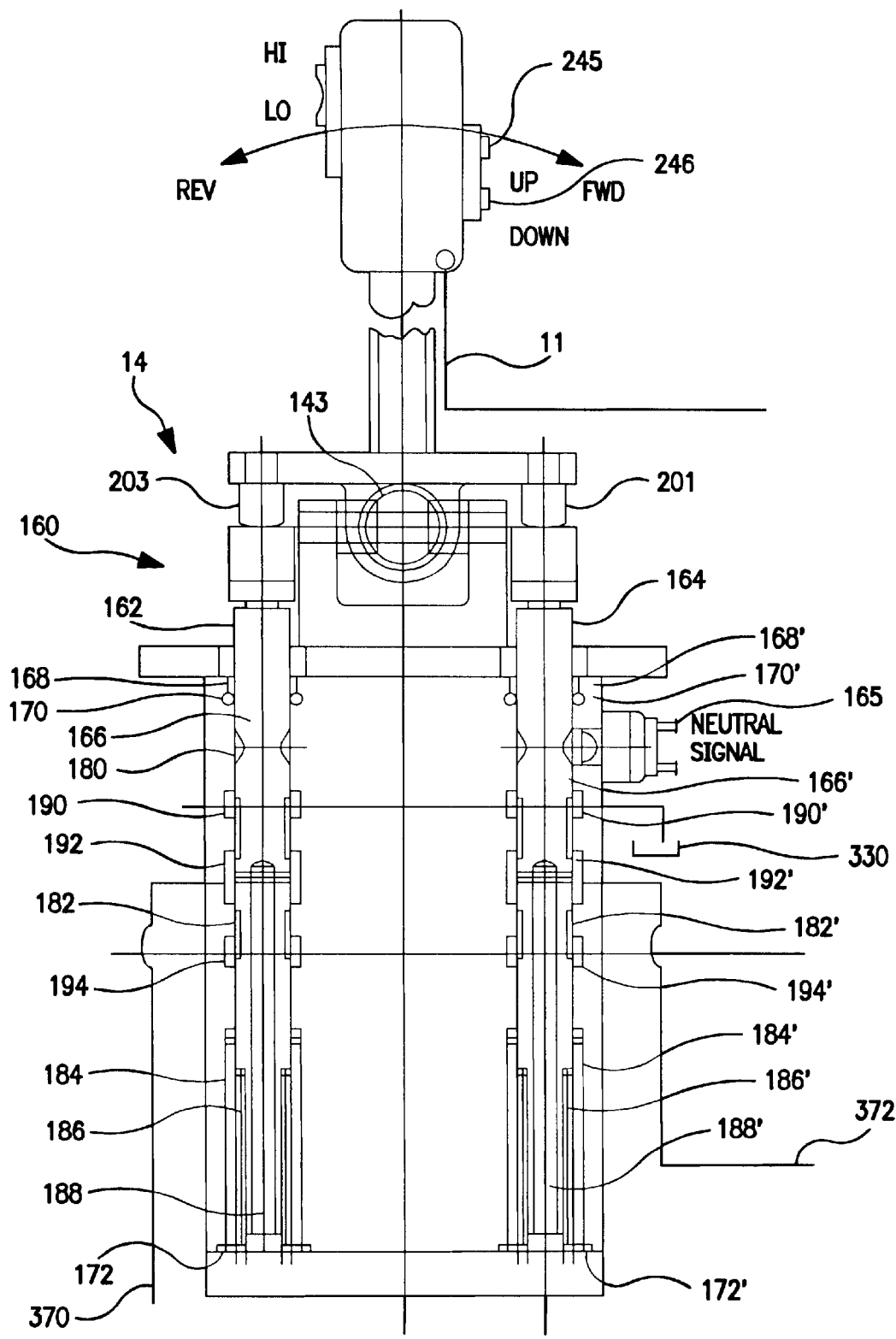
FIG. 5 of the drawings is a schematic representation of the joystick of the present invention shown in FIG. 1 in an orthogonal plane with respect to FIG. 2.

Direction control means 14 is shown in FIG. 5 as comprising second pair of valves 160 and neutral switch 165. Second pair of valves 160 includes forward valve 162 and reverse valve 164 which can each be actuated by joystick 11. Forward valve 162 includes spool 166, casing 168 upper seal 170 and lower seal 172. Spool 166 includes annular depression 180, communication port 182, centering spring 184, return spring 186 and inner passage port 188. Casing 168 includes tank communication port 190, signal port 192 and supply port 194.

It will be understood that reverse valve 164 is substantially identical to forward valve 162 and, as such, reverse valve 164 is will include reference numbers corresponding to those of forward valve 162 augmented by a prime (').

As can be seen in FIG. 1, forward signal port 192 is in communication with the forward transmission signal input 370 of the transmission. Similarly, reverse signal port 192' is in communication with reverse transmission signal input 372 of the transmission. Likewise each of supply ports 194, 194' are associated with the hydraulic oil supply, typically at 270 psi.

Referring now to FIG. 5, in operation, joystick 11, which is likewise utilized for steering in the left and the right directions, is likewise used to direct the transmission into the forward gears or the reverse gears. Accordingly, if the driver desires to place the transmission into the forward mode, the user toggles joystick 11 forward. As the joystick is toggled forward, the joystick pivots about axis 143 so as to force element 201 to depress spool 166' and so as to permit spool 166 to be raised by return spring 186.

Additionally, as the joystick is pivoted, the neutral signal switch is deactivated, and soon thereafter, further movement thereof raises spool 166 and places ports 192 and 194 into fluid communication via port 182 of spool 166. The communication between ports 192 and 194 directs fluid at pressure to the forward signal input 370 of the transmission, thus directing the transmission into the forward gears. In another embodiment, the neutral switch may comprise a magnetic reed switch which is actuated by movement of the joystick into and out of the central portion.

To the contrary, spool 166' is depressed so as to fully isolate port 192' from port 194'. As such no fluid pressure is directed into the rearward signal input 372 of the transmission, essentially directing the transmission not to engage the reverse gearing.

Once the joystick is moved to engage the forward gears, the joystick is retained in position by way of a hydraulic lock. In particular, as fluid under pressure is directed into cavity 192 and into passage 188. This pressure in passage 188 pushes the spool upward toward element 203. The upward movement stops when the corresponding spool 166' contacts the bottom of the casing. The pressure in passage 188 maintains the position of the joystick and spools, thereby providing a hydraulic lock. Of course, the driver can easily overcome this force by pulling on the joystick.

The reverse gearing of the transmission is engaged in an opposite manner. Specifically, as the driver moves the joystick in the opposite direction, element 203 depresses spool 166 and permits spool 166' to be forced upwardly by springs 186'. At such time, neutral signal switch 165 is disengaged and, eventually, the spools will be positioned such that port 192 is fully isolated from port 194, whereas port 192' and 194' are in fluid communication. In turn, fluid is directed to the rearward signal input 372 of the transmission, and not directed to the forward signal input of the transmission. Additionally, the joystick is hydraulically locked in position inasmuch as fluid at pressure is directed from port 192' and in turn into port 188' which then forces spool 166' upward and spool 166' into the bottom of the casing.

Transmission gear control means 18 comprises switches 245, 246 (collectively at least one transmission selector member) (FIGS. 1 and 5) as well as logic driver 247, and solenoids 248 and 249 (FIGS. 1 and 4). Switch 245 and 246 may comprise any number of switches, such as counter switches (such as commonly known bounceless switches). As shown in detail in FIG. 4, solenoid 248 comprises a solenoid which includes input port 250, first output port 251, second output port 252 and third output port 253. First output port 251 is connected to the fluid supply line, second output port is connected to the second gear input line of the transmission, and third output port is associated with the return tank. In a deactivated state, shown schematically as 341, first input port 250 is in fluid communication with first output port 251 and second output port 252 is in fluid communication with third output port 253. In an activated state, as shown schematically as 341', input port 250 is in fluid communication with second output port 252 and first output port 251 is in fluid communication with third output port 253.

Solenoid 249 comprises a solenoid which includes first port 254, second port 255 and third port 256. Port 256 is in fluid communication with first output port 251. Port 254 is associated with the first gear input line of the transmission. Port 255 is associated with the low pressure fluid storage tank. In a deactivated state, shown schematically as 342, port 255 is closed and port 256 and port 254 are in fluid communication. In an activated state, shown schematically as 342', ports 254 and 255 are in fluid communication and port 256 is closed.

Accordingly, in operation, if a signal is to be sent to first gear signal input of the transmission, the solenoid 248 remains deactivated and solenoid 249 is likewise deactivated. If a signal is to be sent to second gear signal input of the transmission, the solenoid 248 is activated whereas port 249 can be activated or deactivated. If a signal is to be sent to neither one of the first and second gear signal inputs, then solenoid 248 is deactivated and solenoid 249 is activated. With the currently used transmissions of, for example, Dressta crawlers, a signal transmitted to the first transmission input will direct the transmission into first gear. A signal transmitted to the second transmission input will direct the transmission into second gear. The transmission will default to third gear in the absence of a signal to either of the first or second gear signal inputs. Thus, since it is most desirable that in an electrical failure, when both of the solenoids are deactivated, the transmission revert to first gear such a configuration is achieved by the solenoid settings. Specifically, if both of the solenoids are deactivated, the fluid will be directed from port 250 through both solenoids to the first gear input of the transmission.

Figure 6:
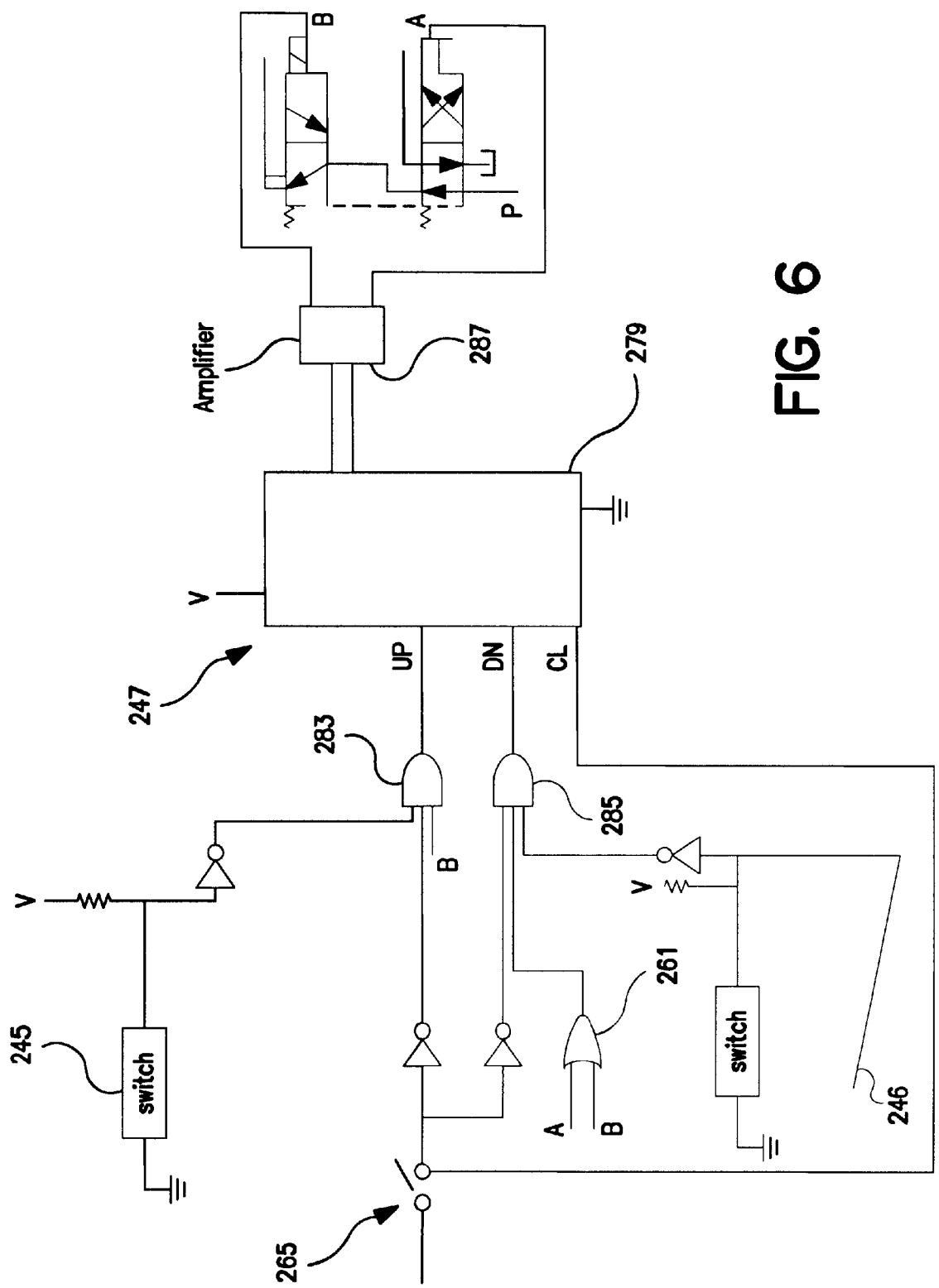
FIG. 6 of the drawings is a schematic representation of the logic controller for the transmission.

Under normal operation (electrical systems are operational) selective activation of the switches in combination with the logic driver 247 will activate and deactivate the solenoids so as to achieve the desired gearing. One embodiment of the logic circuit is shown in FIG. 6. Specifically, logic circuit 247 includes counter 279 (which may comprise a commercially available 94192 up-dn counter having an up pin, a down pin and a clear pin), components 281, 283 and 285. The operation of the logic circuit is best accomplished by way of operation.

Initially the system is neutral namely neutral switch 265 is closed. In such a condition, counter 279 is cleared inasmuch as the neutral switch is connected to the clear pin of counter 279. Subsequently, the driver engages the forward gear which engages first gear. Subsequently, the driver pushes up button 245. The signal is processed by counter 279 and the output from the counter increases from 00 to 01 which activates solenoid 249. In such a manner, the system sends a signal to the second gear input of the transmission and the transmission shifts into second gear. Next, the user again hits the up button 245. This time, the counter output goes from 01 to 10 and this activates only solenoid 249. In this case no signal is sent to either the first or second transmission input and the transmission shifts into third gear. At this time, due to the design of the components, and in particular the positioning of element 283, further pressing of up button 283 does not send further signals to counter 279. Thus, the transmission remains in third gear.

Supposing that the driver desires to switch to a lower gear, the driver merely depresses down button 246 and the counter will adjust down one (namely from 10 to 01) deactivating solenoid 249 and activating solenoid 248. In such a state of activation of the solenoids, a signal is sent to second transmission input and the transmission shifts into second gear. At such time, the driver can again hit the down button 246, and the counter will count down from 01 to 00. In turn, the transmission will shift to first gear. Due to the component 281, and component 285, if the transmission is in first gear (i.e. counter is at 00) further pressing of the down button 246 will not result in further counting down of the counter. Accordingly, as will be understood, in the event of an electrical failure, the counter will revert to 00 which will deactivate both solenoids, and fluid will be provided to first gear input, thus, the transmission will be placed into the desired first gear.

Of course, for other transmissions, it is within the scope of the invention that other signals will be required for directing of the transmission into a desired gear. Such changes to the logic control system are within the scope of the present invention. In addition, by using a binary counter, the number of speeds that can be controlled is quite large. This is useful in, for example, an agricultural setting, such as with tractors which have multiple forward gears.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What I claim is:

1. A motion control system for controlling the motion of a crawler having a left and right track, the system comprising:

a pivotally mounted controller;

steering control means hydraulically communicable with a pressurized fluid supply, a brake of each of a left and right track of a crawler and a clutch of each of a left and right track of a crawler;

direction control means hydraulically communicable with a pressurized fluid supply, a forward and a reverse transmission signal input, wherein pivoting the controller in a first series of planes operates the steering control means and pivoting the controller in a second series of planes operates the direction control means; and means for controlling the steering speed of a left track and a right track, wherein the controlling means comprises at least one selector associated with the controller, the at least one selector comprising:
a left gear switch associated with a left clutch, the left gear switch having at least two settings; and
a right gear switch associated with a right clutch, the right gear switch having at least two settings.

2. The motion control system of claim 1 wherein the steering control means further comprises:
a first steering valve hydraulically communicable with a pressurized fluid supply, a clutch and brake of the right track of a crawler; and
a second steering valve hydraulically communicable with a pressurized fluid supply, a clutch and brake of the left track of a crawler,
wherein pivoting the controller in a first series of planes moves one of the first and second steering valves relative to a respective casing, to, in turn, alter the hydraulic communication between a respective pressurized fluid supply and a respective clutch and brake.

3. The motion control system of claim 2 wherein:
the first steering valve is hydraulically communicable with a right clutch of the crawler, to, in turn, facilitate the selective disengagement of a high clutch setting for the right clutch; and
the second steering valve is hydraulically communicable with a left clutch of the crawler, to, in turn, facilitate the selective disengagement of a high clutch setting for the left clutch.

4. The motion control system of claim 2 wherein:
the first steering valve and the second steering valve are substantially identical.

5. The motion control system of claim 1 wherein the direction control means further comprises:
a forward valve hydraulically communicable with a pressurized fluid supply and a forward transmission signal input;
a reverse valve hydraulically communicable with a pressurized fluid supply and a reverse transmission signal input,
wherein pivoting the controller in a second series of planes moves one of the forward and reverse valve relative to a respective casing, to, in turn, hydraulically communicate a pressurized fluid supply with one of a forward or reverse transmission signal input.

6. The motion control system of claim 5 wherein the forward valve includes a hydraulic lock member, to, in turn, utilize fluid from a pressurized fluid supply to maintain the forward valve in an engaged position.

7. The motion control system of claim 5 wherein the reverse valve includes a hydraulic lock member, to, in turn, utilize fluid from a pressurized fluid supply to maintain the rearward valve in an engaged position.

8. The motion control system of claim 1 further comprising means for controlling the transmission gears.

9. The motion control system of claim 8 wherein the transmission gear control means includes at least one transmission selector member associated with the controller.

10. The motion control system of claim 1 wherein the pivoting of the controller in the first series of planes further operates to selectively override at least one of the at least one selector, to, in turn, return a respective clutch of a respective left and right track of a crawler to a low setting, despite the position of the respective left or right gear switch.

11. The motion control system of claim 1 further comprising:
means for controlling a plurality of gears of a transmission, the transmission gear controlling means comprising at least one transmission gear selector having a pair of switches, the first switch capable of shifting the transmission into a higher gear, and the second switch capable of shifting the transmission into a lower gear.

12. The motion control system of claim 11 wherein the transmission controlling means is structurally configured such that a loss of hydraulic pressure within the transmission controlling means results in a shift of the transmission to a lowest gear setting.

13. A method of controlling the motion of a crawler having a left and right track, the method comprising the steps of:
providing a pivotally mounted controller;
selectively pivoting the controller along a first series of planes, wherein a pivot forward directs the crawler to a forward gear, and a pivot to the rear directs the crawler to the rear;
selectively pivoting the controller along a second series of planes, wherein a pivot to the left directs the crawler to the left, and a pivot to the right directs the crawler to the right;
providing at least one selector for each track on the controller; and
selectively manipulating at least one selector for at least one track to selectively engage one of at least two clutch settings.

14. The method of claim 13 further comprising the steps of:
providing at least one transmission selector on the controller; and
selectively manipulating the at least one transmission selector to selectively engage one of at least two transmission gears.

15. A steering control system comprising:
a pivotally mounted controller;
a first and second steering valve selectively actuatable by the pivotally mounted controller, each steering valve positioned in fluid communication with a brake assembly and a clutch assembly of opposing tracks of a crawler, each steering valve further comprising:
a valve casing;
a valve input spool positioned within the casing;
a metering spool positioned within the casing, the metering spool including:
a coupling fluid port structurally configured to selectively couple a brake assembly and a clutch assembly of a respective track of a crawler to one of high pressure fluid and low pressure fluid; and an equalization pressure fluid port in fluid communication with the coupling fluid port; and;

a metering spring structurally configured to facilitate movement of the metering spool relative to the valve input spool, wherein the metering spring and the pressure within the equalization pressure fluid port are capable of selectively moving the metering spool relative to the valve casing and the valve input spool, to, in turn, reach substantial equilibrium therebetween.

16. A steering control system comprising:

a pivotally mounted controller; and a first and second steering valve selectively actuatable by the pivotally mounted controller, each steering valve positioned in fluid communication with a brake assembly and a clutch assembly of opposing tracks of a crawler, each steering valve further comprising:

a valve casing, the valve casing having a signal dump port and a low pressure port, the signal dump port fluidly associated with a high speed clutch of a respective track of a crawler; and a valve input spool capable of selectively placing the signal dump port in fluid communication with the low pressure port, to, in turn, drain fluid from a high speed clutch of a respective track of a crawler, thereby activating a low speed clutch thereof.

* * * * *